Jan. 11, 1966  R. G. SCHIMPF  3,229,225
DIRECT CURRENT ELAPSED TIME INDICATOR
Filed Jan. 29, 1962  2 Sheets-Sheet 1

Jan. 11, 1966  R. G. SCHIMPF  3,229,225
DIRECT CURRENT ELAPSED TIME INDICATOR
Filed Jan. 29, 1962  2 Sheets-Sheet 2

United States Patent Office 3,229,225
Patented Jan. 11, 1966

3,229,225
DIRECT CURRENT ELAPSED TIME INDICATOR
Richard G. Schimpf, Elgin, Ill., assignor, by mesne assignments, to General Time Corporation, New York, N.Y., a corporation of Delaware
Filed Jan. 29, 1962, Ser. No. 169,512
4 Claims. (Cl. 331—111)

This invention relates to devices for producing an indication of elapsed time, and more particularly to an electrical system for producing timed pulses or converting the same to a mechanical movement.

Although the present invention should not be limited to and will have a scope of application much larger than that disclosed herein, it has been found especially useful in devices where a mechanical indication of elapsed time is desired.

In the past, elapsed time indicators have incorporated solenoid operated mechanical devices including ratchets and pawls for producing incremental mechanical movements at the frequency of output pulses of an oscillator connected in a manner to operate the solenoid by impressing a pulsating direct-current voltage thereon. These devices have suffered from poor accuracy and poor efficiency. They have been inherently inaccurate in that no fine adjustment has ever been provided for a pawl in such a case to determine the position of the pawl during de-energization of the solenoid.

Still further, because all of the oscillators employed in such arrangements heretofore have been sensitive to the direct-current voltage supplied by a direct-current power supply, a further inherent inaccuracy has been encountered. That is, such oscillators have produced output pulses of a frequency substantially dependent upon the magnitude of the power supply output voltage.

An accurate yet exfficient operation of elapsed time indicators of the prior art has been impossible. Prior art indicators designed for accuracy have require voltage regulators, but the same obviously result in the requirement for additional power consumption with an accompanying inefficiency.

In addition to the inaccuracy in the absence of voltage regulation or the inefficiency in the presence of it, oscillators of the prior art employed in elapsed time indicators have also been relatively inefficient in the delivery of pulsed electrical power from a direct-current power supply to an elapsed time indicator solenoid.

The present invention overcomes the above described and other disadvantages of the prior art by providing a direct-current electric motor having an inductive winding, means for impressing a direct-current voltage on the winding, and a diode connected in parallel with the winding, the diode being poled to be non-conductive to current supplied by the said means. The use of the adjustable stop thus improves the accuracy of the device of the present invention over that which may be achieved by prior art elapsed time indicators.

In accordance with an outstanding feature of the invention, a pulse generator to operate an elapsed time indicator solenoid is provided including a source of direct-current having first and second output leads, a first transistor having a base and having a collector-emitter circuit connected serially with the first lead, a second transistor of a conductivity type opposite that of the first transistor, the second transistor having a base and having a collector-emitter circuit connected between the second lead and the first transistor base, a resistor and a capacitor serially connected from the first lead to a point having a potential different therefrom, and a diode connected from the junction of the resistor and capacitor to the second transistor base. In the pulse generator of the present invention, very little electrical power is needed and the pulse generator is unusually efficient in that a short duty cycle is employed. For example, a voltage pulse of a time width equal to .02 second may be periodically produced during each second the pulse generator is in operation. This short duty cycle is made possible by the use of two transistors of opposite conductivity types including a feedback to make the leading and trailing edges of the voltage pulses produced by the pulse generator approximately vertical. Still further, both transistors are alternately operated at cutoff and at saturation whereby substantially no electrical power is required from a direct-current power supply over the .98 second time interval between when voltage pulses are generated. The efficiency of the pulse generator of the present invention is thus outstandingly better than the efficiencies of prior art oscillators.

Another advantage of the present invention resides in the fact that the pulse generator referred to above provides output pulses of a constant repetition frequency substantially independent of temperature or power supply output voltage magnitude.

The above described and other advantages of the present invention will be better understood from the following description when considered in connection with the accompanying drawings.

In the drawings, which are to be regarded as merely illustrative:

Figure 1:
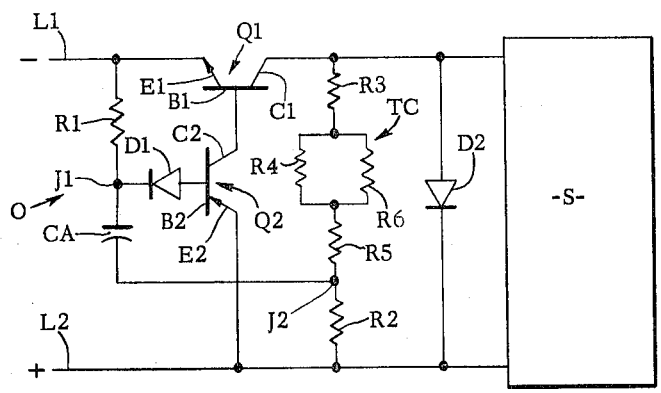
FIG. 1 is a schematic diagram of one embodiment of the present invention.

The schematic diagram of FIG. 1 includes a relaxation oscillator generally idicated at O which is connected to a rotary type solenoid S, a diode D2 being connected in parallel with soledoid S and poled to be conductive in a direction from a negative input lead L1 to a positive input lead L2 between which a 28 volt direct-current power supply is connected.

Oscillator O impresses voltage pulses of a time width approximately equal to .02 second during each second of the operation thereof. Diode D2 prevents the energy stored in the solenoid S from loading the oscillator O during a time immediately following the impression of the output pulse of oscillator O thereon. In particular, it will be noted that solenoid S, being an inductive load, will tend to sustain a current flow such as to maintain lead L1 positive with respect to lead L2. Diode D2 shunts this current.

Oscillator O contains two transistors Q1 and Q2 of opposite conductivity types. In the specific embodiment shown in FIG. 1, Q1 is an NPN conductivity type transistor and Q2 is PNP conductivity type transistor. The collector-emitter circuit of Q1 is connected serially with lead L1, transistor Q1 having a collector C1 connected to solenoid S and an emitter E1 connected to a resistor R1, emitter E1 thus being connected to the negative terminal of the 28 volt direct-current source.

Transistor Q2 is provided with an emitter E2 connected to lead L2 and a collector C2 connected to a base B1 of transistor Q1. A resistive temperature compensation network TC is connected from collector C1 to lead L2 including resistors R3, R4, R5 and R2, respectively, serially connected from collector C1 to lead L2. A fifth resistor R6 is connected in parallel with resistor R4.

A capacitor CA is connected from resistor R1 at a first junction J1 to resistor R2 at a second junction J2.

A diode D1 is connected from junction J1 to a base B2 of transistor Q2.

The operation of the oscillator O is as follows. During the time that both transistors Q1 and Q2 are at saturation and their collector-emitter circuits are highly conductive, capacitor CA charges rapidly through emitter E2, base B2 and diode D1 from lead L2, and then from junction J2 upwardly through resistors R5, R4, R6 and R3, and through collector C1 and emitter E1 to lead L1. Capacitor CA charges to an extent such that the junction J1 approaches the potential of lead L1. When this charging current has dropped to a sufficiently low value, the current of collector C2 will also have dropped to a value so low that it can no longer maintain transistor Q1 in saturation. At this point, the potential at the collector C1 rises slightly. This rise is coupled through capacitor CA to base B2. Since transistor Q2 is a PNP transistor, a rise in voltage at base B2 has the effect of cutting transistor Q2 off. This causes a drop in the voltage of collector C2 and base B1, which rise in turn causes a further rise in the potential of collector C1. This regenerative process rapidly cuts off both transistors Q1 and Q2 and leaves capacitor CA with a voltage nearly equal to that which then exists across resistor R2. Diode D1 prevents this sizable voltage from breaking down the base to emitter junction of transistor Q2.

The capacitor CA must now discharge through resistor R1 in series aiding with the 28 volt direct-current power supply. The resistance of R1 is rather large so that the discharge of capacitor CA takes almost one second. Capacitor CA then passes through zero charge and begins charging to the reverse potential in a path from lead L2 through resistor R2, capacitor CA and resistor R1 to lead L1. When the reverse potential has reached a few tenths of a volt, the base-emitter junction of transistor Q2 and diode D1, as well, become forward biased and a small base current begins flowing in base B2. This is multiplied by the current gain of both transistors Q2 and Q1, with the potential of collector C1 dropping toward that of emitter E1. This drop in potential is submitted by capacitor CA to base B2, further increasing the current therefrom. This regenerative switching action rapidly puts both transistors Q1 and Q2 into full conduction, and rotary solenoid S is actuated.

Temperature compensation network TC is designed for temperature compensation to stabilize the operating frequency of oscillator O. Oscillator O, without compensation, has a negative temperature coefficient of resistivity. Network TC changes the voltage across resistor R2 with temperature in such a manner to tend to offset the temperature coefficient of frequency oscillator O. By changing the voltage across R2, the repetition frequency of the output pulses of oscillator O is changed since the voltage across capacitor CA is likewise changed and the time for discharge through resistor R1 is a function of the initial voltage on capacitor CA. Resistor R5 is a resistor with a positive thermal coefficient of resistivity. Resistor R4 is employed to reduce the effect of resistor R5 at high temperatures where very little temperature compensation is required. Resistors R1, R2, R3 and R6 are conventional and not employed for temperature compensation per se.

Figure 3:
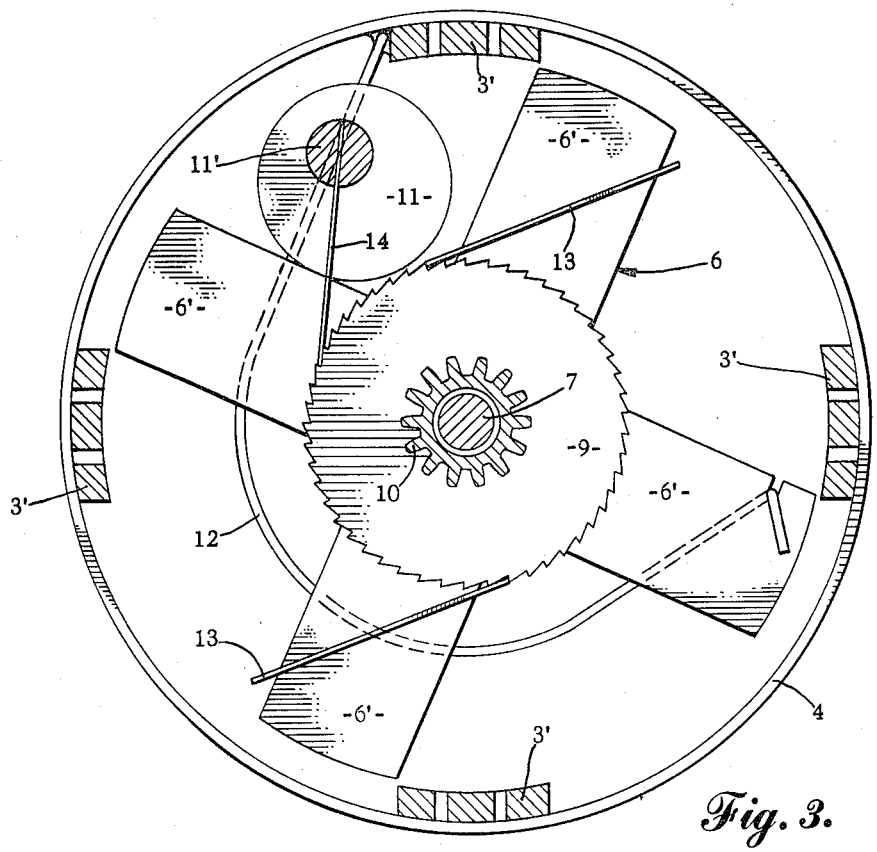
FIG. 3 is a sectional view of the rotary type solenoid taken on the line 3—3 shown in FIG. 2.
Figure 2:
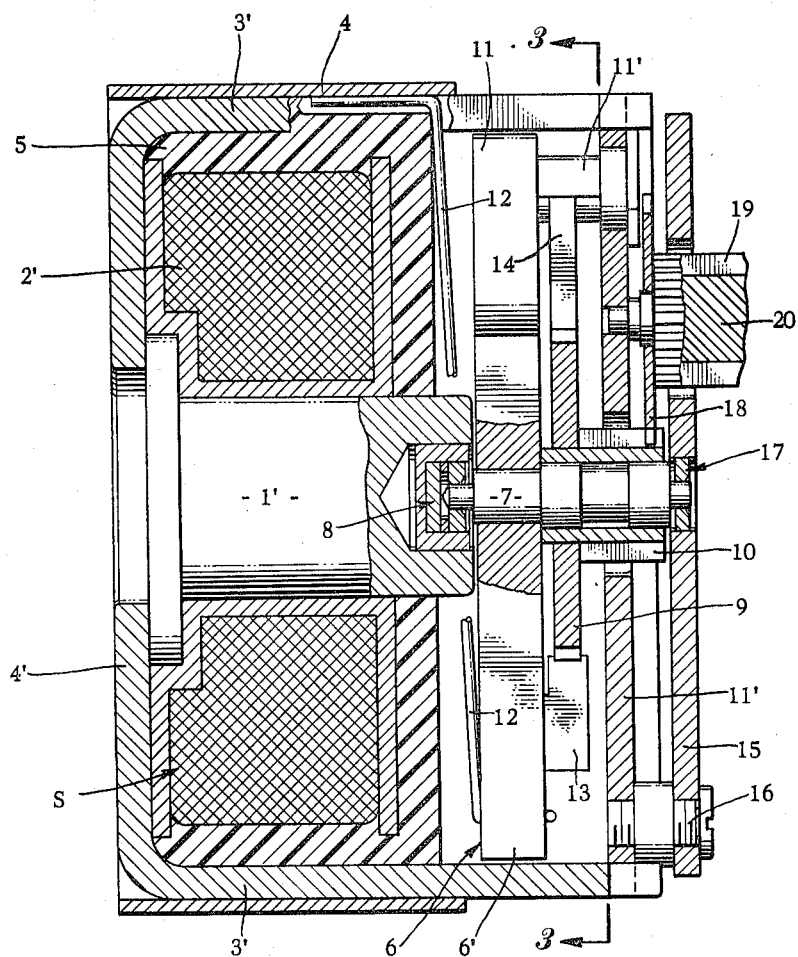
FIG. 2 is a longitudinal sectional view of a rotary type solenoid indicated schematically in FIG. 1.

The mechanical construction of rotary solenoid S is shown in FIGS. 2 and 3. In FIG. 2, rotary solenoid S is shown including a central core 1' centered by bobbin wound coil 2'. A cup shaped pole piece having four separate legs 3' is attached to one end of the core 1' and extends outwardly perpendicularly to the center of core 1' at 4' and then toward the right parallel to the center line of the core 1' so as to enclose coil 2' on one face and outer periphery. Legs 3' of the pole piece extend beyond the opposite end of core 1' to which they are attached. A sleeve 4 surrounds the pole piece legs 3' holding them in place and acting as a retainer for an epoxy resin 5 in which coil 2' is encapsulated.

A flat disc-shaped armature on rotor 6 is also provided which is notched from its outer periphery inward so as to form a number of poles 6' equal to the number of the legs 3', i.e., four each. Armature 6 is securely attached to an armature shaft 7 which is located in a bearing 8 in core 1'. A ratchet wheel 9 attached to a pinion 10 fits loosely around armature shaft 7. When no power is supplied to the coil 2', the rotor 6 is held against a cylindrical stop 11 on a cylindrical shaft 11' in a base 11" for the rotary solenoid S by a return spring 12 so that poles 6' of rotor 6 are offset from poles 3'.

Advancing ratchet wheel 9 is accomplished by two leaf springs 13 which are fixed to two corresponding poles 6' of rotor 6. When power is supplied to coil 2', poles 6' of armature 6 tend to line up with poles 3' and move in a counterclockwise direction as shown in FIG. 3. In this case, ratchet wheel 9 advances one tooth. When power to coil 2' is removed, return spring 12 moves rotor 6 back to the position thereof shown in FIG. 3. During the time that return spring 12 rotates rotor 6 in a clockwise direction, a leaf spring 14 fixed with shaft 11' holds ratchet wheel 9 in its advanced position.

A plate 15 fixed relative to base 11" by a fastening element 16 carries a bearing 17 for the right end of armature shaft 7 shown in FIG. 2. A gear train output from pinion 10 is provided including a gear 18 mounted on a shaft 19 in base 11" and a gear 20 fixed with gear 18. Cam 11 may be pressed onto shaft 11' and shaft 11" may be pressed into base 11". In any event, although the position of cam or stop 11 may be adjusted on shaft 11', the fit of cam 11 on shaft 11' is sufficiently tight so that the force applied to cam 11 by spring 12 through a pole 6' of rotor 6 does not change its position.

From the foregoing, it will be appreciated that the use of the adjustable cam or stop 11 improves the accuracy of the device of the present invention over that which may be achieved through the use of prior art devices.

Still further, the short duty cycle of the oscillator O makes for high efficiency due to the sharp switching characteristics of the two transistors Q1 and Q2, and their regenerative connection. In addition, both transistors Q1 and Q2 are alternately operated at cutoff and at saturation. This means that little electrical power is required from the 28 volt direct-current power supply during relatively long .98 second interval that capacitor CA discharges through resistor R1.

The device of the present invention is therefore not only accurate, but also efficient. Still further, the oscillator O produces an output signal of a substantially constant pulse repetition frequency substantially independent not only of temperature, but also of the magnitude of the output of the 28 volt direct-current power supply.

Although only one specific embodiment of the invention has been disclosed, many changes and modifications thereof will of course suggest themselves to those skilled in the art. The invention is therefore not to be limited to the specific embodiment disclosed herein, the true scope of the invention being defined only in the appended claims.

What is claimed is:

1. A pulse generator comprising: a source of direct-current having first and second output leads; a first transistor having a base and having a collector-emitter circuit connected serially with said first lead; a second transistor of a conductivity type opposite that of said first transistor, said second transistor having a base and having a collector-emitter circuit connected between said second lead and said first transistor base; a first resistor connected from said first lead; a second resistor connected from said second lead; a capacitor connected from said first resistor at a first junction to said second resistor at a second junction; a diode connected from said first junction to said base of said second transistor; and a temperature compensation network connected from said collector of said first transistor to said second junction.

2. A pulse generator comprising: a source of direct-current having negative and positive output leads; an NPN conductivity type transistor having an emitter, a collector and a base, said NPN transistor having its emitter connected to said negative lead; a PNP conductivity type transistor having an emitter, a collector and a base, said PNP transistor having its collector connected to the base of said NPN transistor and its emitter connected to said second lead; a first resistor connected to said negative lead; a second resistor connected from said positive lead; a capacitor connected from said first resistor at a first junction to said second resistor at a second junction; a diode connected from said first junction to said base of said PNP transistor; and a temperature compensation network connected from said collector of said NPN transistor to said second junction.

3. A pulse generator comprising: a source of direct-current having first and second output leads; a first transistor having a base and having a collector-emitter circuit connected serially with said first lead; a second transistor of a conductivity type opposite that of said first transistor, said second transistor having a base and having a collector-emitter circuit connected between said second lead and said first transistor base; a first resistor connected from said first lead; a second resistor connected from said second lead; a capacitor connected from said first resistor at a first junction to said second resistor at a second junction; a diode connected from said first junction to said base of said second transistor; and a temperature compensation network connected from said collector of said first transistor to said second junction, said network including third, fourth and fifth resistors, respectively, connected serially from said NPN transistor collector to said second junction and a sixth resistor connected in parallel with said fourth resistor, said fourth resistor having a negative thermal coefficient of resistivity and said fifth resistor having a positive thermal coefficient of resistivity.

4. A pulse generator comprising: a source of direct-current having negative and positive output leads; an NPN conductivity type transistor having an emitter, a collector and a base, said NPN transistor having its emitter connected to said negative lead; a PNP conductivity type transistor having an emitter, a collector and a base, said PNP transistor having its collector connected to the base of said NPN transistor and its emitter connected to said second lead; a first resistor connected to said negative lead; a second resistor connected from said positive lead; a capacitor connected from said first resistor at a first junction to said second resistor at a second junction; a diode connected from said first junction to said base of said PNP transistor; and a temperature compensation network connected from said collector of said NPN transistor to said second junction, said network including third, fourth and fifth resistors, respectively, connected serially from said NPN transistor collector to said second junction and a sixth resistor connected in parallel with said fourth resistor, said fourth resistor having a negative thermal coefficient of resistivity and said fifth resistor having a positive thermal coefficient of resistivity.

References Cited by the Examiner

UNITED STATES PATENTS

| | | | |
|---|---|---|---|
| 2,527,420 | 10/1950 | Henwood | 74—142 |
| 2,831,113 | 4/1958 | Weller | 307—88.5 |
| 2,901,639 | 8/1959 | Woll | 307—88.5 |
| 2,976,470 | 3/1960 | Krassoievitch et al. | 318—341 |
| 3,041,478 | 6/1962 | Gabor | 318—341 |
| 3,058,362 | 10/1962 | Pirez | 74—142 |
| 3,064,175 | 11/1962 | Vergez | 318—341 |

OTHER REFERENCES

German allowed application, 1,068,756, Nov. 12, 1959 (3 pp. spec., 1 sht. dwg.).

MILTON O. HIRSHFIELD, *Primary Examiner.*

JOHN F. COUCH, O. L. RADER, *Examiners.*

S. GORDON, *Assistant Examiner.*